US012754892B2

(12) United States Patent
Baruch et al.

(10) Patent No.: US 12,754,892 B2
(45) Date of Patent: Oct. 6, 2026

(54) METADATA PAGE ALLOCATION BY STORING A PORTION OF A BITMAP OF METADATA PAGES IN MEMORY

(71) Applicant: Dell Products L.P., Round Rock, TX (US)

(72) Inventors: Oran Baruch, Tel Aviv (IL); Tal Abir, Nesher (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/604,622

(22) Filed: Mar. 14, 2024

(65) Prior Publication Data

US 2025/0291779 A1 Sep. 18, 2025

(51) Int. Cl.
*G06F 16/22* (2019.01)

(52) U.S. Cl.
CPC ................................ *G06F 16/2237* (2019.01)

(58) Field of Classification Search
CPC .................................................. G06F 16/2237
USPC ........................................................ 707/745
See application file for complete search history.

(56) References Cited

U.S. PATENT DOCUMENTS 8,903,830 B2 * 12/2014 Edwards ................. G06F 3/064
707/743
2019/0018601 A1 * 1/2019 Dubeyko .............. G06F 3/0619

OTHER PUBLICATIONS

Demeri, Anthony K; “Poseidon: A Safe and Scalable Persistent Memory Allocator”; Thesis to Virginia Polytechnic Institute and State University; May 4, 2020.

Gay, David; “Design of Matchbox, the Simple Filing System for Motes”; Aug. 21, 2003.

Lu et al.; “ReconFS: A Reconstructable file System on Flash Storage”; storage.cs.tsinghua.edu.cn/papers/fast14-reconfs.pdf/; 12th USENIX Conference on File and Storage Technoligies (FAST ’14); Feb. 17-20, 2014.

* cited by examiner

*Primary Examiner* — Giovanna B Colan
(74) *Attorney, Agent, or Firm* — Ryan, Mason & Lewis, LLP

(57) ABSTRACT

Techniques are provided for metadata page allocation by storing a portion of a bitmap of metadata pages in memory. One method comprises obtaining a request to allocate metadata pages of a metadata storage volume; identifying at least one bit, corresponding to an unallocated metadata page, in a given chunk of a bitmap of metadata pages associated with the metadata storage volume, wherein the given chunk of the bitmap is stored in memory and comprises a portion of the bitmap; updating a bit value of the identified at least one bit to indicate the allocation of the metadata pages of the metadata storage volume; and initiating an allocation of the metadata pages. The bitmap may be allocated to a designated size, and each bit of the bitmap may indicate whether a corresponding metadata page of the metadata storage volume is allocated or unallocated.

20 Claims, 10 Drawing Sheets

METADATA PAGE ALLOCATION BY STORING A PORTION OF A BITMAP OF METADATA PAGES IN MEMORY

BACKGROUND

Distributed storage systems may include distributed storage nodes that are interconnected by a network. Each storage node of a distributed storage system typically processes input/output (I/O) operations from one or more host devices. During the processing of such I/O operations, one or more storage application processes execute on the storage node. The storage application processes may persistently store metadata pages on metadata storage volumes of the distributed storage system.

SUMMARY

Illustrative embodiments of the disclosure provide techniques for metadata page allocation by storing a portion of a bitmap of metadata pages in memory. An exemplary method comprises obtaining a request to allocate one or more metadata pages of at least one metadata storage volume; identifying at least one bit, corresponding to an unallocated metadata page, in a given chunk of a bitmap of metadata pages associated with the at least one metadata storage volume, wherein the given chunk of the bitmap is stored in memory and comprises a portion of the bitmap; updating a bit value of the identified at least one bit to indicate the allocation of the one or more metadata pages of the at least one metadata storage volume; and initiating an allocation of the one or more metadata pages Illustrative embodiments can provide significant advantages relative to conventional techniques for allocating metadata pages. For example, problems associated with expanding the size of metadata storage volumes are overcome in one or more embodiments by storing a portion of a metadata volume bitmap in memory, where each bit of the metadata volume bitmap indicates whether a corresponding metadata page of a metadata storage volume is allocated or unallocated.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for metadata page allocation by storing a portion of a bitmap of metadata pages in memory.

Figure 1:
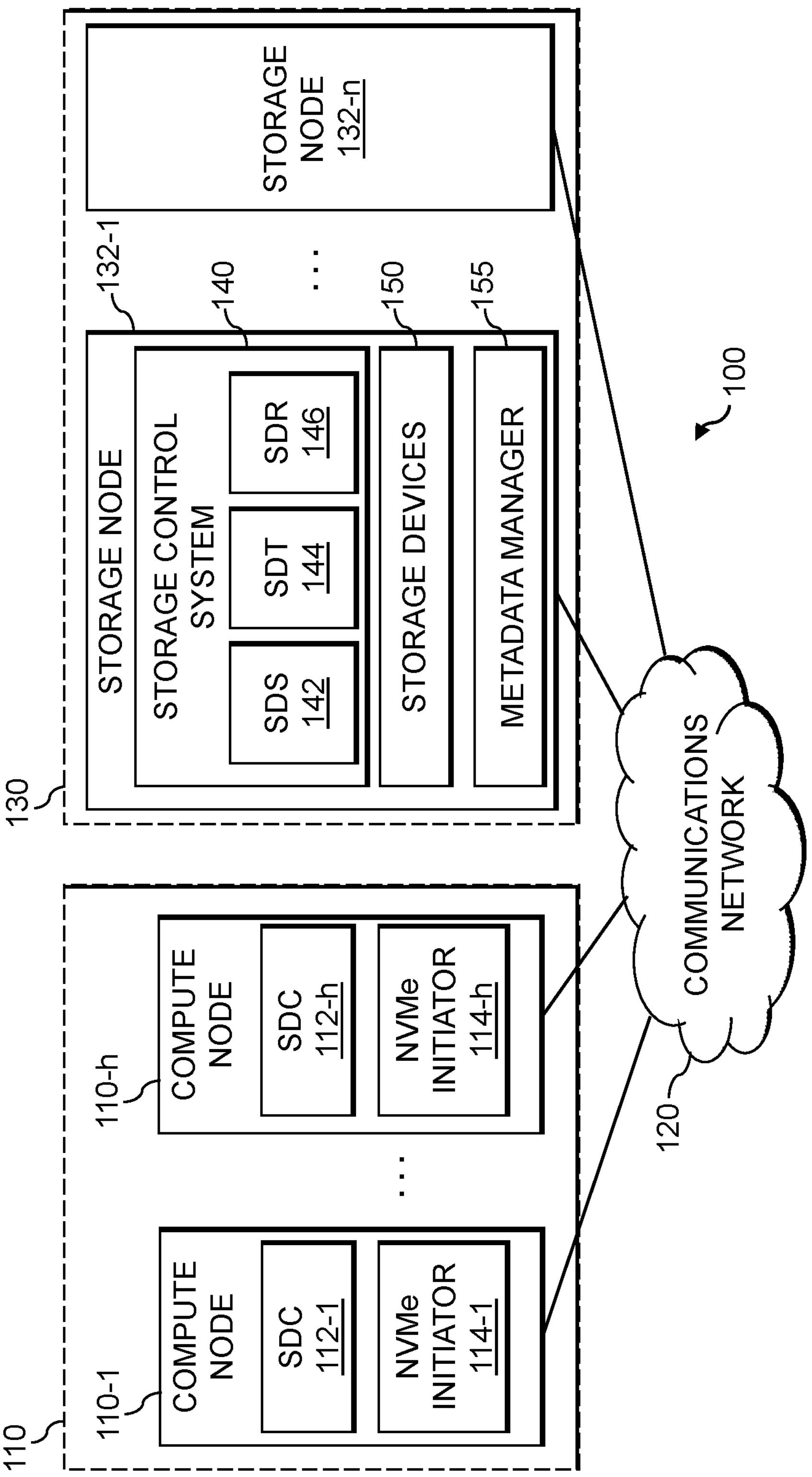
FIG. 1 illustrates a network computing environment that can be configured for metadata page allocation by storing a portion of a bitmap of metadata pages in memory in accordance with an illustrative embodiment.

FIG. 1 schematically illustrates a computing environment 100 that can be configured for metadata page allocation by storing a portion of a bitmap of metadata pages in memory, according to an exemplary embodiment of the disclosure. In particular, FIG. 1 schematically illustrates one or more compute nodes 110-1 . . . 110-*h* (collectively, compute nodes 110), a communications network 120 and a data storage system 130 comprising a plurality of storage nodes 132-1 . . . 132-*n* (collectively, storage nodes 132).

In some embodiments, each compute node 110-1 . . . 110-*h* comprises a storage data client (SDC) 112-1 . . . 112-*h* and a non-volatile memory express (NVMe) initiator 114-1 . . . 114-*h* (or NVMe initiator 114), the functions of which will be explained below.

As further shown in FIG. 1, the storage node 132-1 comprises a storage control system 140, storage devices 150 and a metadata manager (MDM) 155. In some embodiments, the storage control system 140 is a software-defined storage control system that comprises a storage data server (SDS) 142, a storage data target (SDT) 144 and a storage data replicator (SDR) 146, the functions of which will be explained below. In some embodiments, the other storage nodes (e.g., storage node 132-*n*) have the same or similar configuration as the storage node 132-1 shown in FIG. 1.

The compute nodes 110 may comprise physical server nodes and/or virtual server nodes that host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the compute nodes 110 comprise application servers, database servers, etc. The compute nodes 110 can include virtual nodes such as virtual machines and container systems. In some embodiments, the compute nodes 110 comprise a cluster of computing nodes of an enterprise computing system, a cloud-based computing system, or other types of computing systems or information processing systems comprising multiple computing nodes associated with respective users. The compute nodes 110 issue data access requests to the data storage system 130, wherein the data access requests include (i) write requests to store data in one or more of the storage nodes 132 and (ii) read requests to access data that is stored in one or more of the storage nodes 132.

The communications network 120 is configured to enable communication between the compute nodes 110 and the storage nodes 132, as well as peer-to-peer communications between the storage nodes 132. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, that enable communication using, e.g., Transfer Control Protocol/Internet Protocol (TCP/IP) or other communication protocols such as Fibre Channel (FC), FC over Ethernet (FCoE), RDMA over Converged Ethernet (RoCE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

In some embodiments, each storage node 132 comprises a server node (e.g., storage-only node) that is implemented on, e.g., a physical server machine or storage appliance comprising hardware processors, system memory, and other hardware resources that execute software and firmware to implement the functionality of the storage node 132 and the associated storage control system 140. In some embodiments, each storage node 132 comprises a plurality of control processors that execute a lightweight operating system (e.g., a customized lightweight Linux kernel) and functional software (e.g., software-defined storage software) to implement functions of the storage control system 140, as discussed in further detail below.

The storage devices 150 of a given storage node 132 can be internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 150 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 150 may be implemented on each storage node 132. In this regard, the term "storage device" as used herein should be broadly construed to encompass all types of persistent storage media including hybrid drives. On a given storage node 132, the storage control system 140 is configured to communicate with the storage devices 150 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

The data storage system 130 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out storage system that allows additional storage nodes to be added (or removed) to the cluster to scale the performance and storage capacity of the data storage system 130. It is to be noted that each storage node 132 and associated storage devices 150 is an example of what is more generally referred to herein as a "storage system" or a "storage array."

In some embodiments, the data storage system 130 comprises a dynamic scale-out software-defined storage system that is configured to implement a high-capacity block-level SAN storage system (e.g., virtual SAN system) that consolidates the capacity of the storage devices 150 (e.g., HDDs, SSDs, NVMe flash storage, flash PCIe cards etc.) of the storage nodes 132 into shared block storage that is logically partitioned into logical storage volumes identified by, e.g., logical unit numbers (LUNs). In an exemplary embodiment of a scale-out software-defined SAN storage system, the storage control systems 140 comprise software components of a software-defined storage system, that are executed on the storage nodes 132 to implement a software-defined storage environment in which the storage nodes 132 form a loosely coupled storage server cluster and collectively communicate and operate to create a server-based SAN system (e.g., virtual SAN) to provide host access to a virtual pool of block storage using the combined storage capacity (e.g., storage devices 150) of the storage nodes 132.

In some embodiments, the SDCs 112, the MDMs 155, the SDSs 142, the SDTs 144, and the SDRs 146 of the storage nodes 132 comprise software components of a software-defined storage platform, wherein the software components are installed on physical server machines (or server nodes) such as application servers, storage servers, control servers, etc. In some embodiments, virtual machines (e.g., Linux-based virtual machines) are utilized to host the software components of the software-defined storage platform. The software components collectively implement various functions for deploying and managing a software-defined, scale-out server SAN architecture that can grow from a few servers to thousands of servers.

For example, the SDS 142 comprises a service that is configured to manage the storage capacity (e.g., storage devices 150) of a single server (e.g., storage node 132) and provide back-end access to the storage devices of the server. In other words, the SDS 142 is installed on each server that contributes some or all of the capacity of its local storage devices to the scale-out data storage system. More specifically, in the scale-out software-defined storage environment, the SDSs 142 of the storage control systems 140 are configured to create and manage storage pools (e.g., virtual pools of block storage) by aggregating storage capacity of the respective storage devices 150 and dividing each storage pool into one or more volumes, wherein the volumes are exposed to the SDCs 112 of the compute nodes 110 as virtual block devices. For example, a virtual block device can correspond to a volume of a storage pool. Each virtual block device comprises any number of actual physical storage devices, wherein each virtual block device is preferably homogenous in terms of the type of storage devices that make up the block device (e.g., a block device can include only HDD devices or SSD devices, etc.). In this regard, each instance of the SDS 142 that runs on a respective one of the storage nodes 132 contributes some or all of its local storage space to an aggregated virtual pool of block storage with varying performance tiers (e.g., HDD, SSD, etc.) within a virtual SAN.

In some embodiments, each SDC 112 that executes on a given compute node 110 comprises a lightweight block device driver that is deployed to expose shared block volumes to the compute nodes 110. In particular, each SDC 112 is configured to expose the storage volumes as block devices to the applications located on the same server (e.g., application server) on which the SDC 112 is installed. In other words, as shown in FIG. 1, the SDCs 112 run on the same server machines as the compute nodes 110 that require access to the block devices exposed and managed by the SDSs 142 of the storage nodes 132. The SDC 112 of a given compute node 110 exposes block devices representing the virtual storage volumes that are currently mapped to the given compute node 110. In particular, the SDC 112 for a given compute node 110 serves as a block driver for the compute node 110, wherein the SDC 112 intercepts I/O requests, and utilizes the intercepted I/O request to access the block storage that is managed by the SDSs 142. The SDCs 112 are installed in the operating system or hypervisor hosting the application layer and provide the operating system or hypervisor (that runs the SDC 112) access to the logical block devices (e.g., volumes). The SDCs 112 have knowledge of which SDSs 142 hold its block data, so multipathing can be accomplished natively through the SDCs 112, where the communications network 120 is configured to provide an any-to-any connection between the compute nodes 110 and the storage nodes 132. More specifically, each SDC 112 connects to every SDS 142, which eliminates the need for multipath software, in at least some embodiments.

In some embodiments, the MDMs 155 implement a management layer on one or more of the storage nodes 132 that manages and configures the software-defined storage system in the computing environment 100. The MDMs 155 are services that function as a monitoring and configuration agent of the storage environment. More specifically, in some embodiments, the management layer is configured to supervise the operations of the storage cluster and manage storage cluster configurations. For example, the MDMs 155 (or an MDM cluster) manage the storage system by aggregating the entire storage exposed to the MDM cluster by the SDSs 142 to generate a virtual storage layer (e.g., virtual SAN storage layer), wherein logical volumes can be defined over storage pools and exposed to host applications as a local storage device using the SDCs 112.

Further, the MDMs 155 are configured to manage various types of metadata associated with the software-defined storage system. For example, such metadata includes a mapping of the SDCs 112 to the SDSs 142 of the storage nodes 132, wherein such mapping information is provided to the SDCs 112 and the SDSs 142 to allow such components to control I/O data path operations (e.g., allow the SDCs 112 to communicate with target SDSs 142 to access data in logical volumes that are mapped to the SDCs 112). In addition, the MDMs 155 collect connectivity status updates from the SDCs 112 to monitor all connections between SDCs 112 and the SDSs 142 to determine the current system state, and post events whenever a given SDC 112 connects to or disconnects from a specific IP address of a given SDS 142.

In addition, the MDMs 155 may be configured to manage various management operations such as data migration, rebuilds, and other system-related functions. In this regard, the MDMs 155 generate and manage various types of metadata that are required to perform various management operations in the storage environment such as, e.g., performing data migration operations, performing rebalancing operations, managing configuration changes, managing the SDCs 112 and the SDSs 142, maintaining and updating device mappings, maintaining management metadata for controlling data protection operations such as snapshots, replication, RAID configurations, etc., managing system capacity including storage device allocations and/or release of capacity, performing operations for recovery from errors and failures, and system rebuild tasks, etc. The MDMs 155 communicate with the SDCs 112 to provide notification of changes in data layout, and communicate with the SDSs 142 to coordinate rebalancing operations. In some embodiments, the MDMs 155 are configured to implement a distributed cluster management system.

In some embodiments, the software-defined storage system utilizes various logical entities that link the physical layer to the virtual storage layer, wherein such logical entities include protection domains, fault sets, and storage pools. In some embodiments, a protection domain is a logical entity that comprises a group of SDSs 142 that provide backup for each other. Each SDS 142 belongs to only one protection domain such that each protection domain comprises a unique set of SDSs 142. In some embodiments, each protection domain can have up to a maximum number of SDS nodes (e.g., 128 SDS nodes). The use of protection domains enables optimal performance, reduction of mean time between failure (MTF) issues, and the ability to sustain multiple failures in different protection domains.

Further, in some embodiments, a fault set is a logical entity that defines a logical group of SDS nodes (within a protection domain) that are more inclined to fail together, e.g., a group of SDS nodes within a given protection domain that are all powered in a same rack. By grouping SDS nodes into a given fault set, the system is configured to mirror the data for all storage devices in the given fault set, wherein mirroring is performed on SDS nodes that are outside the given fault set. A fault unit can be either a fault set or an SDS node that is not associated with a fault set. In some embodiments, user data is maintained in a RAID-1 mesh mirrored layout, where each piece of data is stored on two different fault units. The copies are distributed over the storage devices according to an algorithm that ensures uniform load of each fault unit in terms of capacity and expected network load.

Moreover, in some embodiments, a storage pool is a logical entity that defines a set of physical storage devices in a protection domain, wherein each storage device belongs to only one storage pool. When a volume is configured over the virtualization storage layer, in some embodiments, the volume is distributed over all devices residing in the same storage pool. Each storage pool comprises a homogeneous set of storage devices (e.g., HDD storage pool, or SSD storage pool) to enable storage tiering. In some embodiments, each volume block has two copies located on two different fault units (e.g., two different SDS nodes), that allows the system to maintain data availability following a single-point failure.

The SDR 146 is a software component that is configured to implement a data replication system, e.g., journal-based asynchronous replication. In some embodiments, asynchronous replication is performed between two peer data storage systems, which are connected via a WAN. In general, in some embodiments, asynchronous replication involves writing data to a source (primary) volume in a first data storage system and acknowledging completion of an I/O write operation to a host application before the data is replicated to a target (replica) volume in a second (remote) data storage system (e.g., the source (primary) volume and the target (replica) volume do not share hardware elements in at least some embodiments). With asynchronous replication, the I/O write operations at a source storage node are logged in a replication journal by a source SDR 146 on the source storage node, and the replication journal is periodically transmitted at scheduled times to a target storage node, wherein a target SDR 146 on the target storage node processes the received replication journal to replicate data to a target (replica) volume. The data replication system can be utilized for various purposes including, but not limited to, recovering from a physical or logical disaster, migrating data, testing data at a remote site, or offloading a data backup operation.

More specifically, in the exemplary embodiment of FIG. 1, the SDR 146 is responsible for processing all I/O requests associated with replicated volumes. In the source system, for replicated volumes, the SDCs 112 communicate with the SDR 146. For non-replicated volumes, the SDCs 112 communicate directly with the SDSs 142. At a source storage node, application I/O requests associated with a replicated volume are sent in some embodiments by an SDC 112 to a source SDR 146. The source SDR 146 will write the required journal data to a replication journal volume, and then send a duplicate of the replication I/O write request and associated user data to the SDS 142 wherein the SDS 142 performs write operations to write the received I/O user data in a primary volume. The journal data is then transmitted to a target SDR 146 on a target storage node, which processes the received replication journal to replicate data to the target (replica) volume. In some embodiments, a minimum of two SDRs are deployed on the source and target storage nodes to maintain high availability. If one SDR fails, the management layer (e.g., one or more MDM nodes) directs the SDCs to send the I/O requests for replicated volumes to an available SDR 146.

The SDT 144 is a software component that is configured to provide support for, for example, NVMe-oF, in particular, NVMe over TCP (NVMe/TCP) that enables NVMe-oF across a standard Ethernet network. In some embodiments, the SDT 144 is configured in the storage layer to handle the I/O requests of the NVMe initiators 114 to provide support for the NVMe/TCP storage protocol for front end connectivity, and thus, allow the use of NVMe/TCP hosts in addition to the SDCs 112. In some embodiments, the SDT 144 is an NVMe target that is configured to translate control and I/O data path packets to the NVMe standard protocol, wherein each NVMe initiator 114 is serviced by multiple SDTs 144 depending on the supported number of paths in the NVMe multipathing driver. In essence, I/O requests are sent from a host NVMe initiator 114 (which is installed in the host operating system or hypervisor) to the SDT 144, and the SDT 144 communicates with a target SDS 142 to direct the I/O request to the target SDS 142.

A distributed storage system may employ user data storage volumes for storing user data, and metadata storage volumes for storing the metadata corresponding to the user data. The metadata associated with a given SDS may be managed by one or more metadata units. The ownership of the user data storage capacity may be spread among multiple metadata units. The number of metadata units on a given SDS may vary. The different metadata units on an SDS may each have a different number of metadata pages at a given time. In order to provide a scalable system, one or more aspects of the disclosure recognize that the metadata storage volumes should start at a designated size and be expandable to support additional metadata pages.

Figure 2:
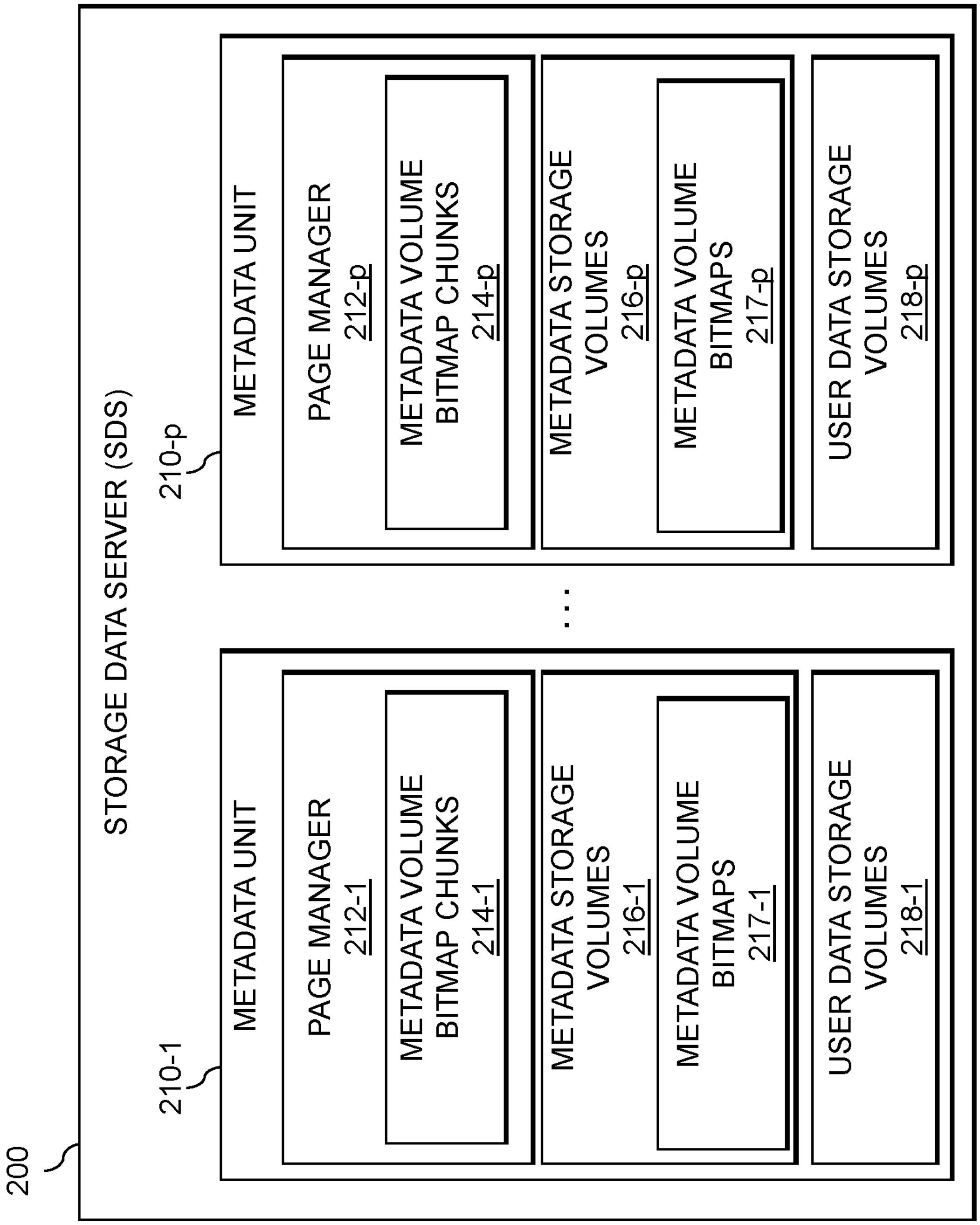
FIG. 2 illustrates a storage data server of FIG. 1 in further detail in accordance with an illustrative embodiment.

FIG. 2 illustrates an SDS of FIG. 1 in further detail in accordance with an illustrative embodiment. In the example of FIG. 2, an SDS 200 comprises one or more metadata units 210-1 . . . 210-*p* (collectively, metadata units 210). In some embodiments, metadata unit 210-1 comprises a respective page manager 212-1, one or more metadata storage volumes 216-1, and one or more user data storage volumes 218-1. The metadata storage volumes 216-1 and the user data storage volumes 218-1 are configured to store metadata pages and user data pages, respectively, and may also store additional information, such as checkpoints and write journals.

The page manager 212-1 splits the metadata storage volumes 216-1 into metadata pages (not shown in FIG. 2), and processes requests to allocate and deallocate metadata pages on a metadata storage volume. In some fault scenarios, the page manager 212-1 may rebuild the metadata stored in one or more of the metadata storage volumes 216-1. Generally, a metadata page characterizes a plurality of user data pages stored on user data storage volumes 218-1. For example, in a given set of user data pages, each of the user data pages may be characterized by a storage volume identifier, an offset and possibly a signature.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages and/or the user data pages.

The user data pages are part of the user data storage volumes 218-1 (e.g., LUNs) configured to store files, blocks, objects or other arrangements of data, each also generally referred to herein as a "data item," on behalf of users. The user data stored in the user data pages can include any type of user data that may be utilized in the computing environment 100. The terms "metadata page" and "user data" herein are therefore also intended to be broadly construed.

Each of the metadata storage volumes 216-1 store metadata pages as well as a corresponding metadata volume bitmap 217-1, where each bit of the metadata volume bitmap 217-1 indicates whether a corresponding metadata page of a respective metadata storage volume 216 is allocated or unallocated. In this manner, the metadata volume bitmap 217-1 is persistently stored, to permit a recovery following a failure in a relatively quick manner. Among other benefits of the disclosed metadata page allocation techniques, the metadata volume bitmap 217-1 does not need to be copied during runtime to a new larger bitmap during an expansion of the metadata storage volumes 216-1 (which would require a complicated non-disruptive copy).

As noted above, the page manager 212-1 processes requests to allocate and deallocate metadata pages on a metadata storage volume. The page manager 212-1 may store one or more chunks 214-1 of a designated size (e.g., 1 MB per chunk) of the metadata volume bitmap 217-1 in memory (e.g., to reduce the processing time of such allocate and deallocate operations). Thus, in an implementation that stored two chunks of the metadata volume bitmap 217-1 in memory, approximately 2 MB of memory is utilized to store the chunks. In this manner, the page manager 212-1 can quickly identify new metadata pages, providing an optimal path in some embodiments. Likewise, the deallocation of such metadata pages does not require any prior knowledge. In some embodiments, additional chunks 214-1 of the metadata volume bitmap 217-1 may be stored in memory, when such additional memory is available.

As discussed further below in conjunction with FIG. 3, a given metadata volume bitmap 217-1 is preallocated to a designated size, such as the largest expected size, corresponding to the maximum storage capacity of the metadata storage volumes 216-1 divided by a designated minimum number of metadata units 210 divided by the metadata page size and divided by eight (8) for the number bits in a byte.

In some embodiments, the additional metadata units, such as metadata unit 210-*p*, are assumed to be configured in a similar manner as metadata unit 210-1.

Figure 3:
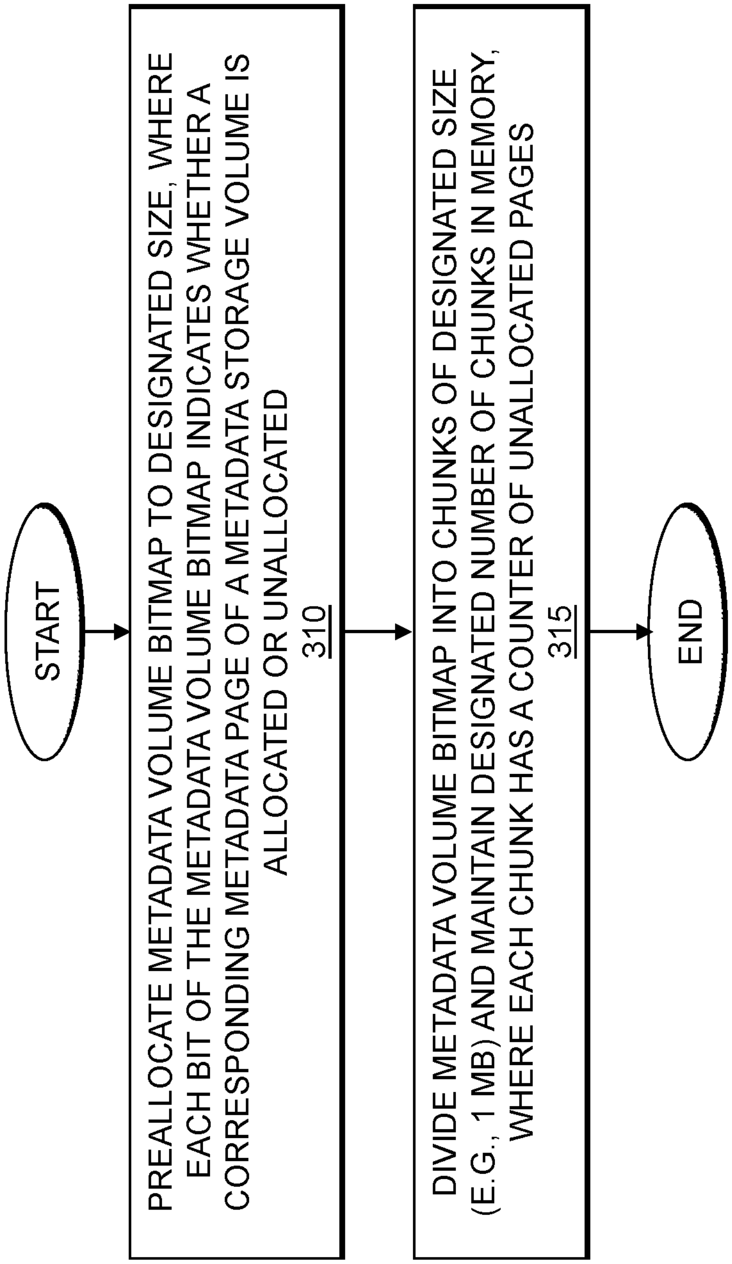
FIG. 3 is a flow diagram illustrating an exemplary implementation of a metadata volume bitmap allocation process in accordance with an illustrative embodiment.

FIG. 3 is a flow diagram illustrating an exemplary implementation of a metadata volume bitmap allocation process in accordance with an illustrative embodiment. The metadata volume bitmap allocation process may be implemented, for example, by a page manager, such as the page manager 212-1 of FIG. 2. In the example of FIG. 3, a metadata volume bitmap (e.g., corresponding to a given metadata storage volumes) is preallocated in step 310 to a designated size, such as a largest expected size, where each bit of the metadata volume bitmap indicates whether a corresponding metadata page of a metadata storage volume is allocated or unallocated. The largest expected size may correspond to the maximum storage capacity of the metadata storage volumes divided by a designated minimum number of metadata units in an SDS divided by the metadata page size and divided by eight (8) for the number bits in a byte. While conventional metadata page allocation techniques expanded the metadata volume bitmap for each expansion of the metadata storage volumes, the disclosed metadata page allocation techniques, in some embodiments, preallocate the metadata volume bitmap to the largest expected size.

In step 315, the preallocated metadata volume bitmap is divided into chunks of a designated size (e.g., 1 MB per chunk) and a designated number of chunks is maintained in memory, where each chunk has a counter of unallocated pages for the respective metadata storage volume.

Figure 4:
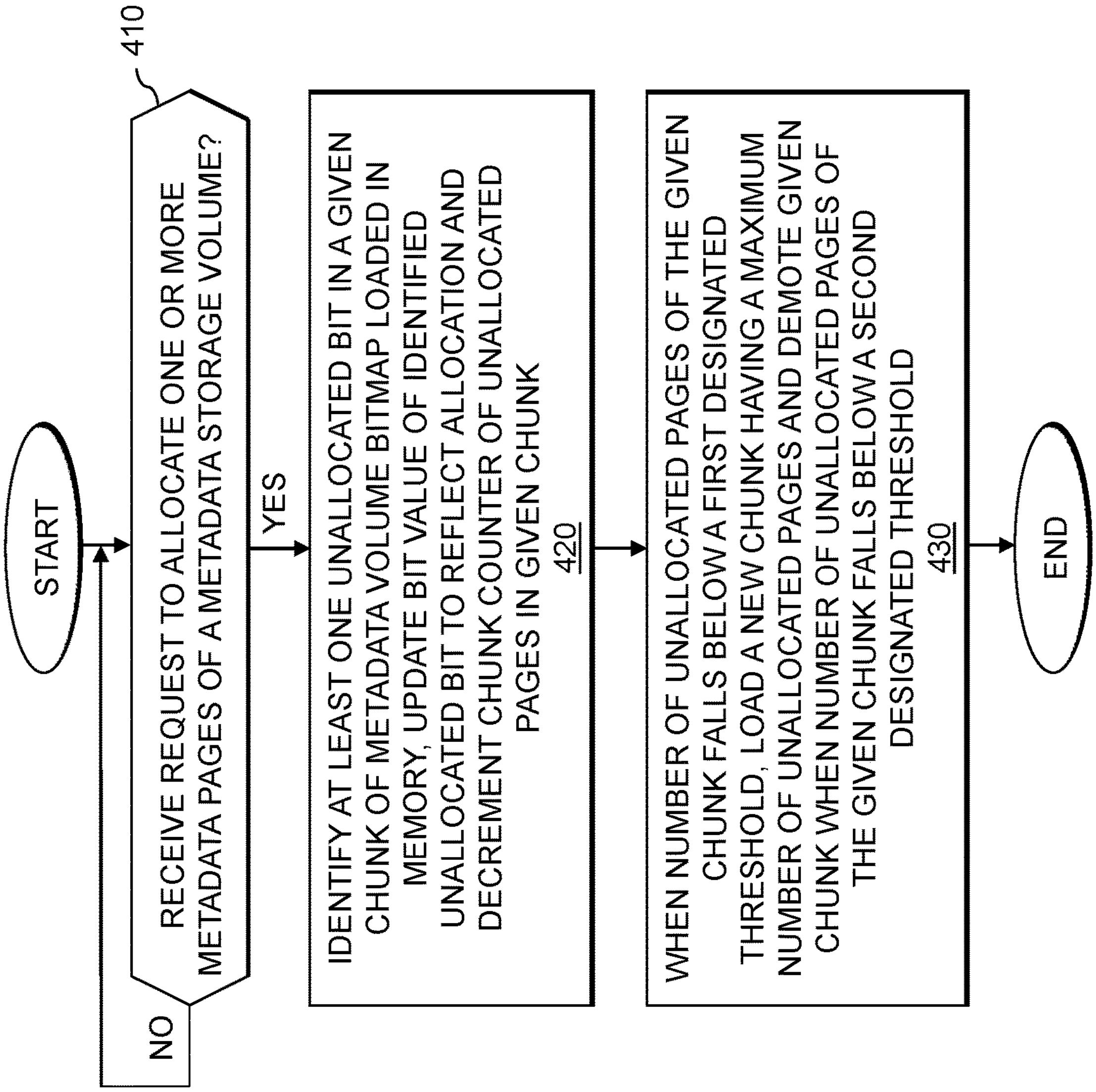
FIG. 4 is a flow diagram illustrating an exemplary implementation of a metadata page allocation process in accordance with an illustrative embodiment.

FIG. 4 is a flow diagram illustrating an exemplary implementation of a metadata page allocation process in accordance with an illustrative embodiment. The metadata page allocation process may be implemented, for example, by the page manager 212-1 of FIG. 2. In the example of FIG. 4, a test is performed in step 410 to determine if a request is received to allocate one or more metadata pages of a metadata storage volume. If it is determined in step 410 that a request is not received to allocate one or more metadata pages of a metadata storage volume, then program control returns to step 410 to continue monitoring for an allocation request.

If, however, it is determined in step 410 that a request is received to allocate one or more metadata pages of a metadata storage volume, then, in step 420, at least one unallocated bit is identified in a given chunk of the metadata volume bitmap loaded (e.g., stored) in memory, the bit value of identified unallocated bit is updated to reflect the allocation and the chunk counter of unallocated pages in the given chunk is decremented.

In step 430, when the number of unallocated pages of the given chunk falls below a first designated threshold, a new chunk is loaded having a maximum number of unallocated pages and the given chunk is demoted when the number of unallocated pages of the given chunk falls below a second designated threshold (for example, after the given chunk is out of entries, e.g., when the number of unallocated pages of the given chunk is zero).

Figure 5:
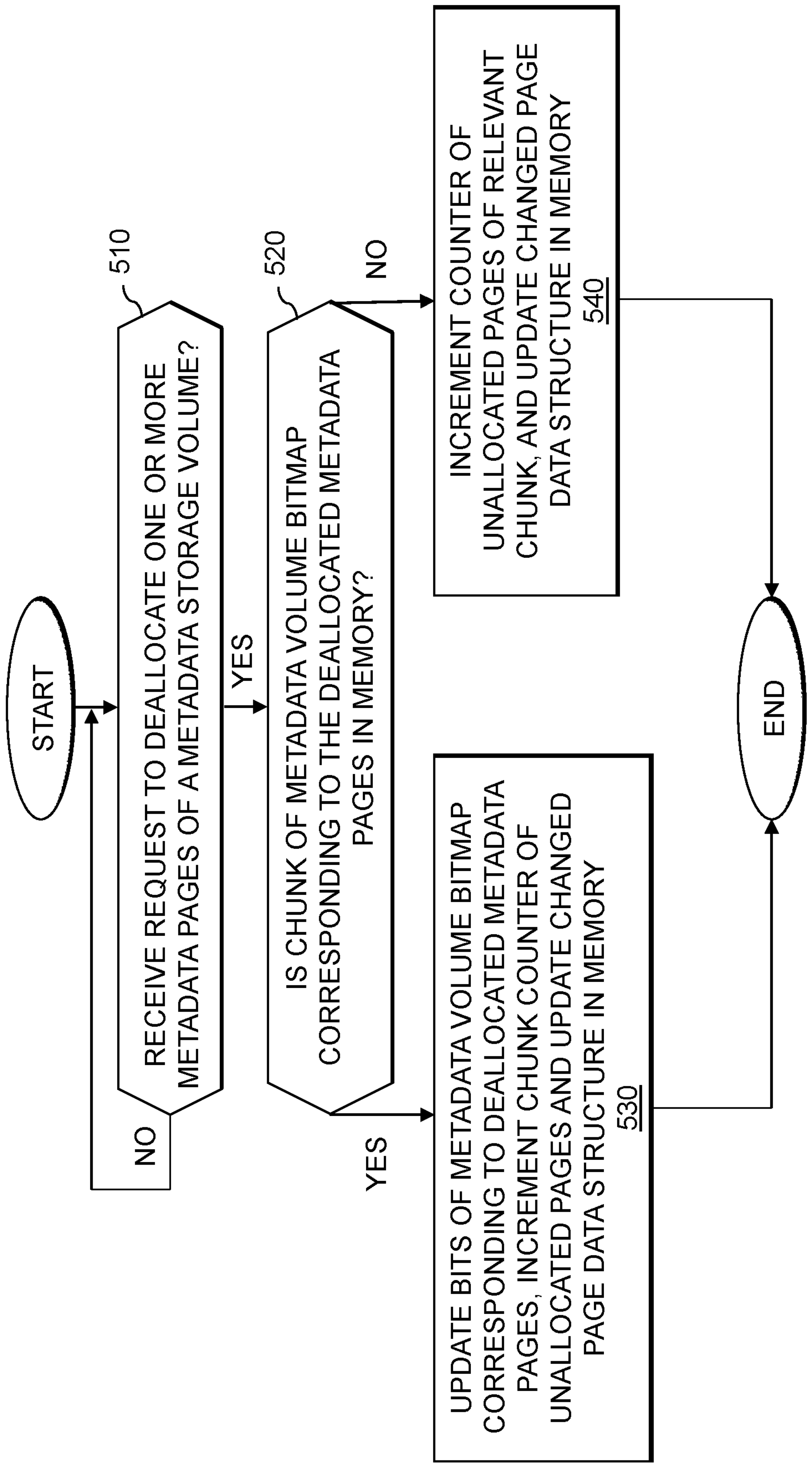
FIG. 5 is a flow diagram illustrating an exemplary implementation of a metadata page deallocation process in accordance with an illustrative embodiment.

FIG. 5 is a flow diagram illustrating an exemplary implementation of a metadata page deallocation process in accordance with an illustrative embodiment. The metadata page deallocation process may be implemented, for example, by the page manager 212-1 of FIG. 2. One or more aspects of the disclosure recognize that while an allocation can happen from the same bitmap chunk in memory, a deallocation can happen with respect to any bitmap chunk whether or not in memory.

In the example of FIG. 5, a test is performed in step 510 to determine if a request is received to deallocate one or more metadata pages of a metadata storage volume. If it is determined in step 510 that a request is not received to deallocate one or more metadata pages of a metadata storage volume, then program control returns to step 510 to continue monitoring for a deallocation request.

If, however, it is determined in step 510 that a request is received to deallocate one or more metadata pages of a metadata storage volume, then, in step 520, a further test is performed to determine whether the chunk of the metadata volume bitmap corresponding to the deallocated metadata pages is in memory. If it is determined in step 520 that the chunk of the metadata volume bitmap corresponding to the deallocated metadata pages is in memory, then, in step 530, the bits of the metadata volume bitmap corresponding to the deallocated metadata pages are updated, the chunk counter of unallocated pages for the relevant chunk (e.g., the chunk corresponding to the deallocated metadata pages) is incremented and the changed page data structure of the relevant chunk is updated in memory. As discussed further below in conjunction with FIG. 6, the changed page data structure of a given chunk comprises a list of deallocated metadata pages associated with the given chunk of the metadata volume bitmap.

If, however, it is determined in step 520 that the chunk of the metadata volume bitmap corresponding to the deallocated metadata pages is not in memory, then, in step 540, the counter of unallocated pages of the relevant chunk (e.g., the chunk corresponding to the deallocated metadata pages) is incremented, and the changed page data structure of the relevant chunk is updated in memory.

Figure 6:
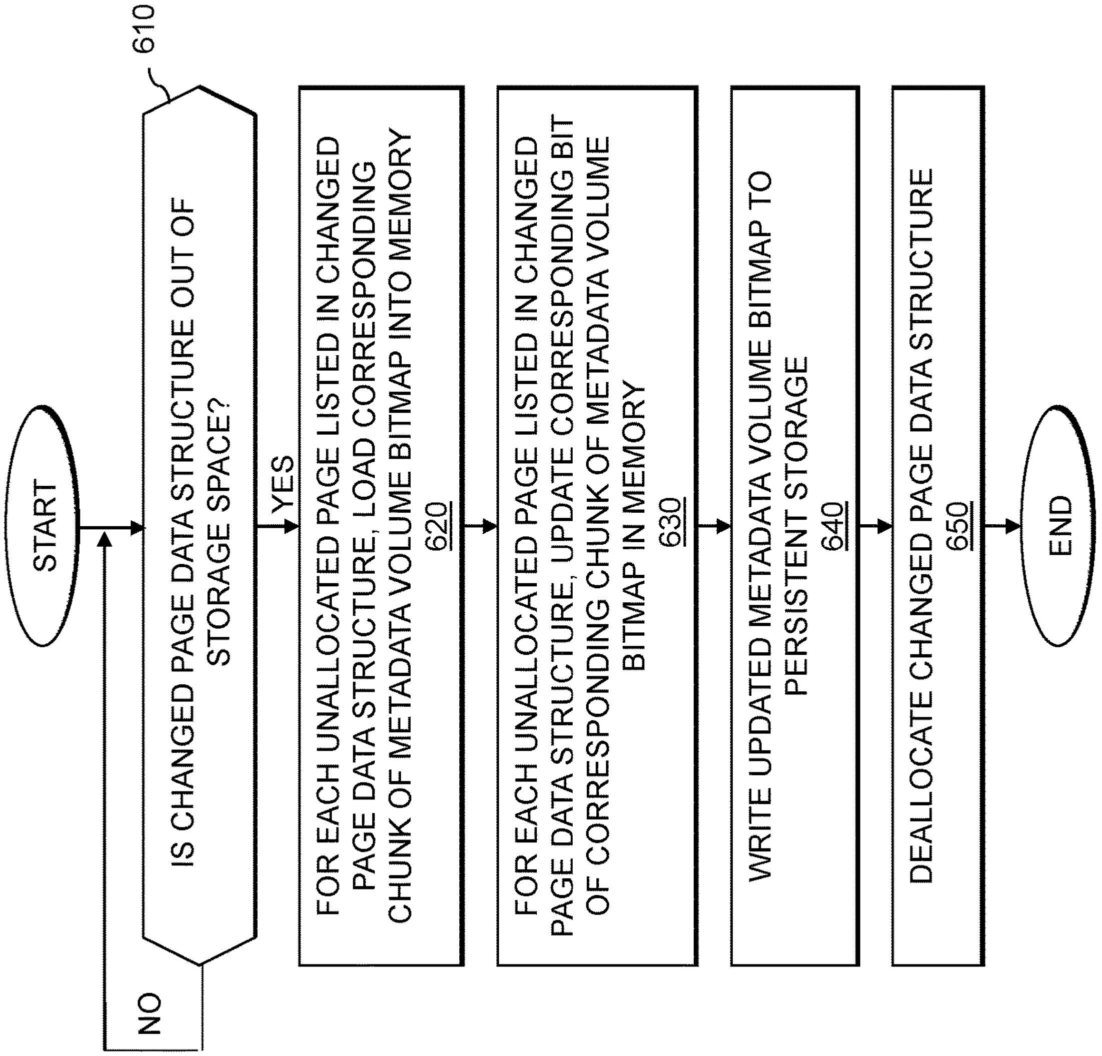
FIG. 6 is a flow diagram illustrating an exemplary implementation of a changed page data structure maintenance process in accordance with an illustrative embodiment.

FIG. 6 is a flow diagram illustrating an exemplary implementation of a changed page data structure maintenance process in accordance with an illustrative embodiment. The changed page data structure maintenance process may be implemented, for example, by the page manager 212-1 of FIG. 2. The changed page data structure may be employed, for example, when the relevant bitmap chunk (e.g., the bitmap chunk associated with deallocated metadata page) is not in memory and one or more bit values of the bitmaps need to be updated.

In the example of FIG. 6, a test is performed in step 610 to determine if the changed page data structure is out of storage space. If it is determined in step 610 that the changed page data structure is not out of storage space, then program control returns to step 610 to continue monitoring the available storage space of the changed page data structure.

If it is determined in step 610 that the changed page data structure is out of storage space, then, for each unallocated page listed in the changed page data structure, step 620 loads the corresponding chunk of the metadata volume bitmap into memory. In step 630, for each unallocated page listed in the changed page data structure, the corresponding bit of the corresponding chunk of the metadata volume bitmap in memory is updated.

The updated metadata volume bitmap is written to a persistent storage (e.g., a metadata storage volume) in step 640. In this manner, when the changed page data structure is out of storage space, the relevant bitmap chunks are loaded, updated and then the updated metadata volume bitmap is written back to the persistent storage. The changed page data structure is then deallocated in step 650.

Figure 7:
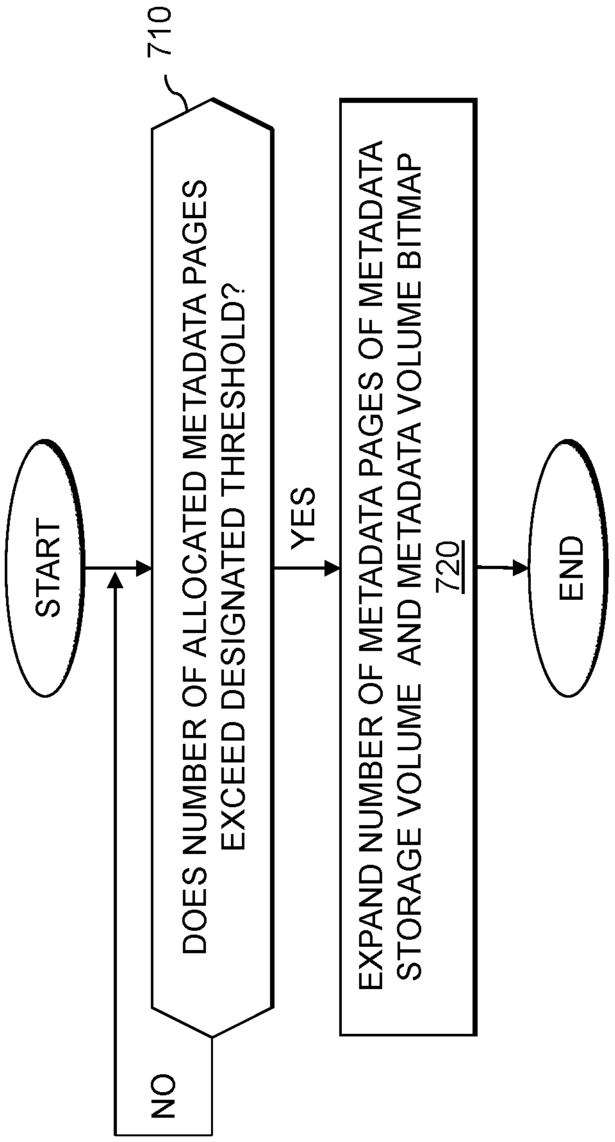
FIG. 7 is a flow diagram illustrating an exemplary implementation of a metadata page expansion process in accordance with an illustrative embodiment.

FIG. 7 is a flow diagram illustrating an exemplary implementation of a metadata page expansion process in accordance with an illustrative embodiment. The metadata page expansion process may be implemented, for example, by the page manager 212-1 of FIG. 2.

In the example of FIG. 7, a test is performed in step 710 to determine if the number of allocated (or unallocated) metadata pages exceeds a designated threshold (e.g., following a recent allocation of one or more metadata pages). If it is determined in step 710 that the number of allocated metadata pages does not exceed a designated threshold, then program control returns to step 710 to continue monitoring the number of allocated metadata pages.

If, however, it is determined in step 710 that the number of allocated metadata pages does exceed the designated threshold, then the number of metadata pages of the metadata storage volume and the metadata volume bitmap is expanded in step 720.

In this manner, when the number of allocated metadata pages reaches a designated used pages threshold, an expansion is triggered to increase the number of metadata pages of one or more metadata storage volumes, as well as the corresponding metadata volume bitmaps.

Figure 8:
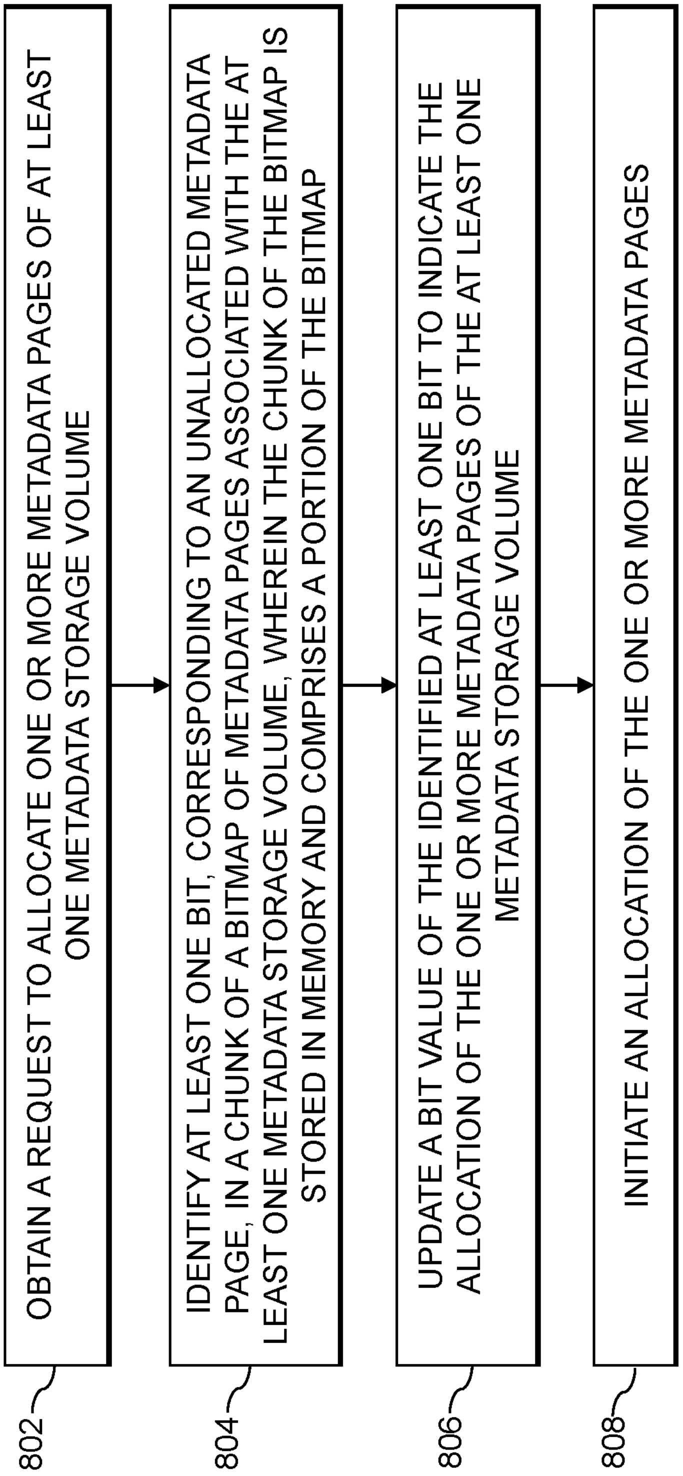
FIG. 8 is a flow diagram illustrating an exemplary implementation of a method for metadata page allocation by storing a portion of a bitmap of metadata pages in memory, according to one or more embodiments of the disclosure.

FIG. 8 is a flow diagram illustrating an exemplary implementation of a method for metadata page allocation by storing a portion of a bitmap of metadata pages in memory, according to one or more embodiments of the disclosure. In the example of FIG. 8, a request to allocate one or more metadata pages of at least one metadata storage volume is obtained in step 802.

In step 804, at least one bit, corresponding to an unallocated metadata page, is identified in a given chunk of a bitmap of metadata pages associated with the at least one metadata storage volume, wherein the given chunk of the bitmap is stored in memory and comprises a portion of the bitmap. A bit value of the identified at least one bit is updated in step 806, to indicate the allocation of the one or more metadata pages of the at least one metadata storage volume.

An allocation of the one or more metadata pages is initiated in step 808.

In one or more embodiments, the bitmap may be allocated to a designated size, and each bit of the bitmap may indicate whether a corresponding metadata page of the at least one metadata storage volume is allocated or unallocated, for example, as discussed above in conjunction with FIG. 3. A new chunk of the bitmap may be loaded, having a designated number of bits corresponding to unallocated metadata pages, in response to the number of unallocated metadata pages of the given chunk falling below a first designated threshold. The given chunk may be demoted, for example, in response to the number of unallocated metadata pages of the given chunk falling below a second designated threshold.

In some embodiments, a request to deallocate one or more metadata pages of the at least one metadata storage volume is obtained; a determination is made as to whether a particular chunk of the bitmap corresponding to the deallocated one or more metadata pages is stored in memory; and: (i) in response to the particular chunk being in memory: one or more bits of the bitmap corresponding to the deallocated one or more metadata pages is updated, a counter of a number of unallocated metadata pages in the particular chunk is incremented and a data structure in memory comprising a list of unallocated metadata pages is updated; and/or (ii) in response to the particular chunk not being in memory: the counter of the number of unallocated metadata pages in the particular chunk corresponding to the deallocated one or more metadata pages is incremented, and the data structure in memory comprising the list of unallocated metadata pages is updated. In response to the data structure comprising the list of unallocated metadata pages exceeding a designated amount of storage space, for each unallocated metadata page listed in the data structure, a corresponding chunk of the bitmap may be stored in memory and a bit of the corresponding chunk of the bitmap corresponding to the respective listed unallocated metadata page may be updated. The updated bitmap may be stored in a persistent storage device and the data structure comprising the list of unallocated metadata pages may be deallocated.

In at least one embodiment, a counter of a number of unallocated metadata pages in the given chunk may be decremented. In response to a number of allocated metadata pages of the at least one metadata storage volume exceeding a designated threshold, a number of metadata pages of the at least one metadata storage volume and a size of the bitmap may be expanded.

The particular processing operations and other network functionality described in conjunction with the flow diagrams of FIGS. 3 through 8 are presented by way of illustrative example only and should not be construed as limiting the scope of the disclosure in any way. Alternative embodiments can use other types of processing operations for metadata page allocation by storing a portion of a bitmap of metadata pages in memory. For example, the ordering of the process steps may be varied in other embodiments, or certain steps may be performed concurrently with one another rather than serially. In one aspect, the process can skip one or more of the actions. In other aspects, one or more of the actions are performed simultaneously. The processing of one or more of the actions can also be distributed between multiple components. In some aspects, additional actions can be performed.

In some embodiments, techniques are provided for metadata page allocation by storing a portion of a bitmap of metadata pages in memory. In at least some embodiments, the disclosed metadata page allocation techniques reduce the time to process requests to allocate and/or deallocate metadata pages.

One or more embodiments of the disclosure provide improved methods, apparatus and computer program products for metadata page allocation by storing a portion of a bitmap of metadata pages in memory. The foregoing applications and associated embodiments should be considered as illustrative only, and numerous other embodiments can be configured using the techniques disclosed herein, in a wide variety of different applications.

It should also be understood that the disclosed metadata page allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for metadata page allocation by storing a portion of a bitmap of metadata pages in memory may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based metadata page allocation processing engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based metadata page allocation processing platform in illustrative embodiments. The cloud-based systems can include block storage such as Amazon EBS (Elastic Block Store), GCP Persistent Disk, and Microsoft Azure Managed Disks.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
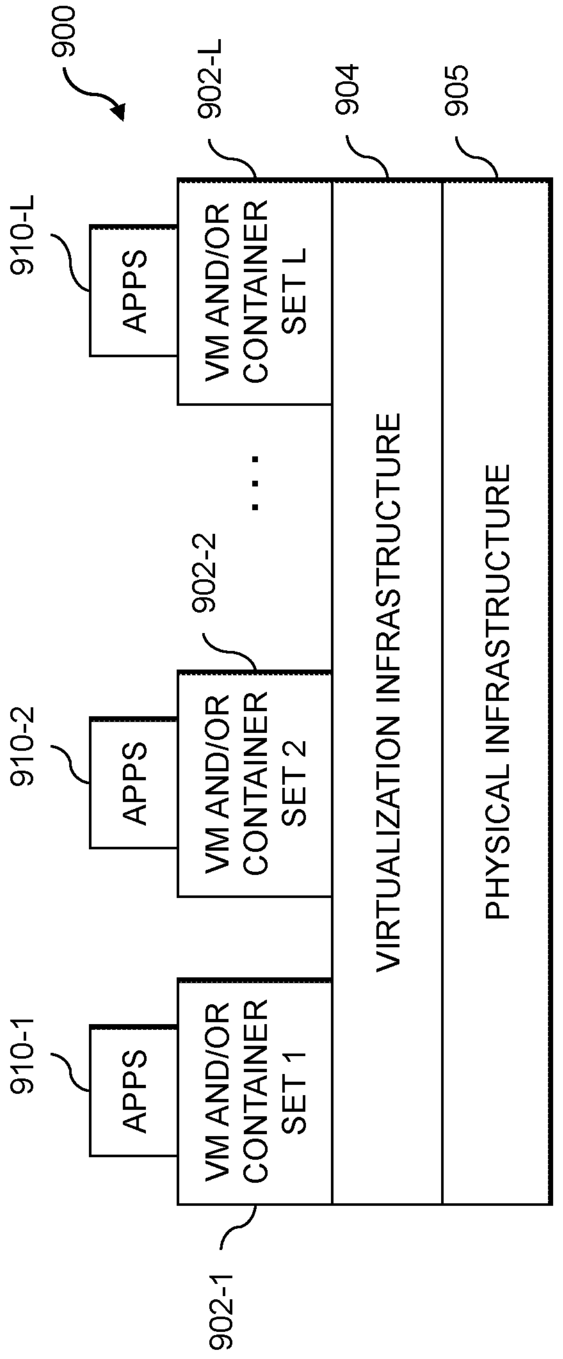
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of an information processing system. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide metadata page allocation functionality of the type described above for one or more processes running on a given one of the VMs. For example, each of the VMs can implement metadata page allocation control logic and associated functionality for tracking whether the corresponding metadata page of the at least one metadata storage volume is allocated or unallocated.

An example of a hypervisor platform that may be used to implement a hypervisor within the virtualization infrastructure 904 is a compute virtualization platform which may have an associated virtual infrastructure management system such as server management software. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide metadata page allocation functionality of the type described above for one or more processes running on different ones of the containers. For example, a container host device supporting multiple containers of one or more container sets can implement one or more instances of metadata page allocation control logic and associated functionality for tracking whether the respective metadata page of the at least one metadata storage volume is allocated or unallocated.

As is apparent from the above, one or more of the processing modules or other components of the information processing system may each run on a computer, server, storage device or other processing platform element. A given such element may be viewed as an example of what is more generally referred to herein as a processing device. The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a WAN, a LAN, a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
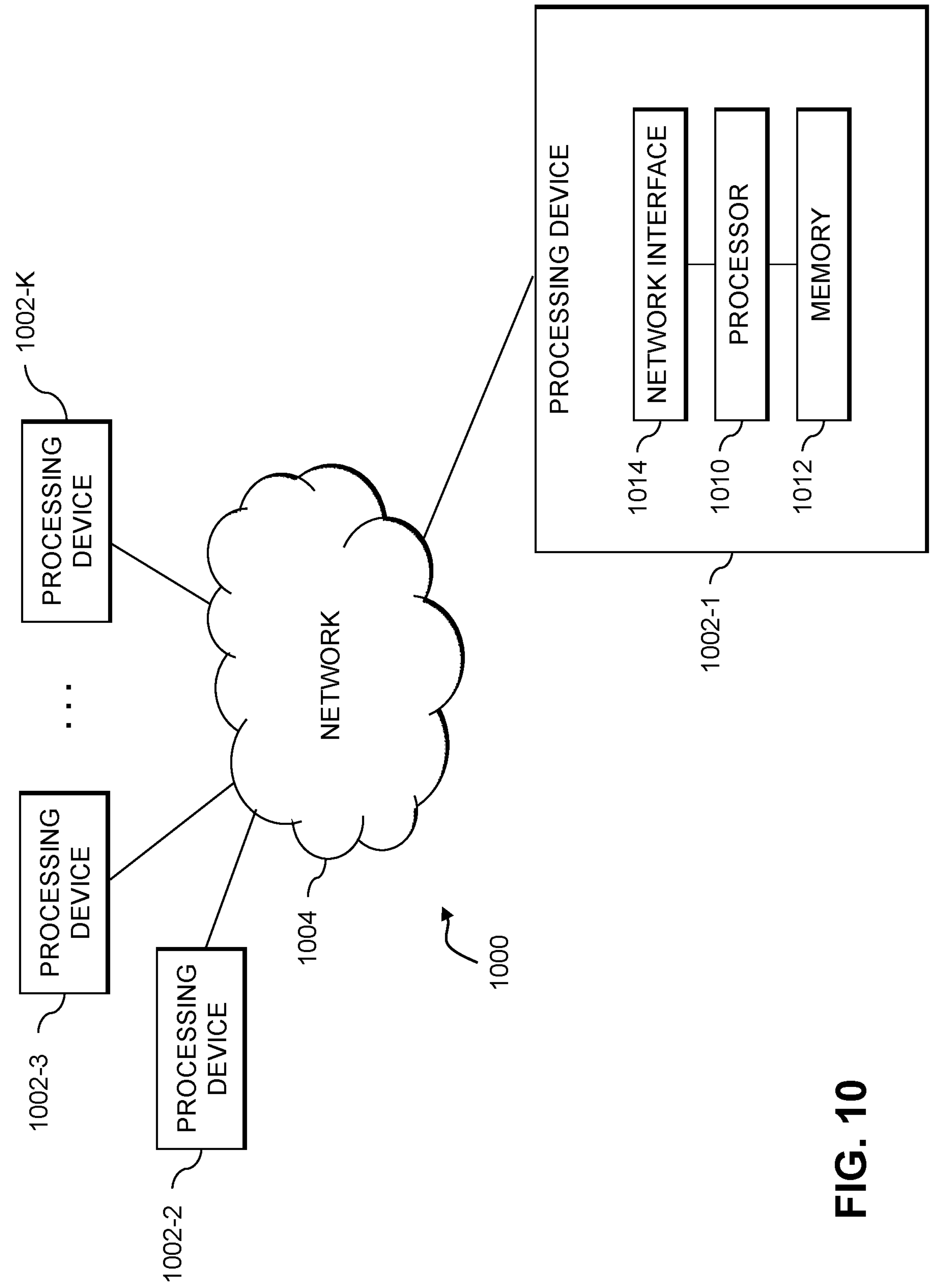
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining a request to allocate one or more metadata pages of at least one metadata storage volume, wherein the at least one metadata storage volume is distinct from at least one data storage volume, wherein the at least one data storage volume stores data pages and wherein a given one of the at least one metadata storage volume persistently stores (i) metadata pages, corresponding to the data pages, and (ii) a metadata bitmap, wherein the metadata bitmap of the given metadata storage volume is divided into a plurality of chunks and wherein a designated number of the plurality of chunks of the metadata bitmap is maintained in memory, wherein each bit of the given metadata bitmap indicates whether a corresponding metadata page of the given metadata storage volume is allocated or unallocated;

identifying at least one bit, corresponding to an unallocated metadata page, in a given chunk of a metadata bitmap of metadata pages associated with the at least one metadata storage volume, wherein the given chunk of the metadata bitmap is stored in memory and comprises a portion of the metadata bitmap;

updating a bit value of the identified at least one bit in of the metadata bitmap to indicate the allocation of the one or more metadata pages of the at least one metadata storage volume; and initiating an allocation of the one or more metadata pages;

wherein the method is performed by at least one processing device comprising a processor coupled to a memory.

2. The method of claim 1, wherein the metadata bitmap is allocated to a designated size.

3. The method of claim 1, further comprising loading a new chunk of the metadata bitmap having a designated number of bits corresponding to unallocated metadata pages in response to the number of unallocated metadata pages of the given chunk falling below a first designated threshold.

4. The method of claim 3, further comprising demoting the given chunk in response to the number of unallocated metadata pages of the given chunk falling below a second designated threshold.

5. The method of claim 1, further comprising obtaining a request to deallocate one or more metadata pages of the at least one metadata storage volume; determining whether a particular chunk of the metadata bitmap corresponding to the deallocated one or more metadata pages is stored in memory; and performing one or more of: (i) in response to the particular chunk being in memory: updating one or more bits of the metadata bitmap corresponding to the deallocated one or more metadata pages, incrementing a counter of a number of unallocated metadata pages in the particular chunk and updating a data structure in memory comprising a list of unallocated metadata pages; and (ii) in response to the particular chunk not being in memory: incrementing the counter of the number of unallocated metadata pages in the particular chunk corresponding to the deallocated one or more metadata pages, and updating the data structure in memory comprising the list of unallocated metadata pages.

6. The method of claim 5, further comprising, in response to the data structure comprising the list of unallocated metadata pages exceeding a designated amount of storage space, for each unallocated metadata page listed in the data structure: storing a corresponding chunk of the metadata bitmap in memory and updating a bit of the corresponding chunk of the metadata bitmap corresponding to the respective listed unallocated metadata page.

7. The method of claim 6, further comprising storing the updated metadata bitmap in a persistent storage device and deallocating the data structure comprising the list of unallocated metadata pages.

8. The method of claim 1, further comprising decrementing a counter of a number of unallocated metadata pages in the given chunk.

9. The method of claim 1, further comprising, in response to a number of allocated metadata pages of the at least one metadata storage volume exceeding a designated threshold, expanding a number of metadata pages of the at least one metadata storage volume and a size of the metadata bitmap.

10. An apparatus comprising:

at least one processing device comprising a processor coupled to a memory;

the at least one processing device being configured to implement the following steps:

obtaining a request to allocate one or more metadata pages of at least one metadata storage volume, wherein the at least one metadata storage volume is distinct from at least one data storage volume, wherein the at least one data storage volume stores data pages and wherein a given one of the at least one metadata storage volume persistently stores (i) metadata pages, corresponding to the data pages, and (ii) a metadata bitmap, wherein the metadata bitmap of the given metadata storage volume is divided into a plurality of chunks and wherein a designated number of the plurality of chunks of the metadata bitmap is maintained in memory, wherein each bit of the given metadata bitmap indicates whether a corresponding metadata page of the given metadata storage volume is allocated or unallocated;

identifying at least one bit, corresponding to an unallocated metadata page, in a given chunk of a metadata bitmap of metadata pages associated with the at least one metadata storage volume, wherein the given chunk of the metadata bitmap is stored in memory and comprises a portion of the metadata bitmap;

updating a bit value of the identified at least one bit in of the metadata bitmap to indicate the allocation of the one or more metadata pages of the at least one metadata storage volume; and initiating an allocation of the one or more metadata pages.

11. The apparatus of claim 10, wherein the metadata bitmap is allocated to a designated size.

12. The apparatus of claim 10, further comprising loading a new chunk of the metadata bitmap having a designated number of bits corresponding to unallocated metadata pages in response to the number of unallocated metadata pages of the given chunk falling below a first designated threshold, and demoting the given chunk in response to the number of unallocated metadata pages of the given chunk falling below a second designated threshold.

13. The apparatus of claim 10, further comprising obtaining a request to deallocate one or more metadata pages of the at least one metadata storage volume; determining whether a particular chunk of the metadata bitmap corresponding to the deallocated one or more metadata pages is stored in memory; and performing one or more of: (i) in response to the particular chunk being in memory: updating one or more bits of the metadata bitmap corresponding to the deallocated one or more metadata pages, incrementing a counter of a number of unallocated metadata pages in the particular chunk and updating a data structure in memory comprising a list of unallocated metadata pages; and (ii) in response to the particular chunk not being in memory: incrementing the counter of the number of unallocated metadata pages in the particular chunk corresponding to the deallocated one or more metadata pages, and updating the data structure in memory comprising the list of unallocated metadata pages.

14. The apparatus of claim 13, further comprising, in response to the data structure comprising the list of unallocated metadata pages exceeding a designated amount of storage space, for each unallocated metadata page listed in the data structure: storing a corresponding chunk of the metadata bitmap in memory and updating a bit of the corresponding chunk of the metadata bitmap corresponding to the respective listed unallocated metadata page.

15. The apparatus of claim 10, further comprising, in response to a number of allocated metadata pages of the at least one metadata storage volume exceeding a designated threshold, expanding a number of metadata pages of the at least one metadata storage volume and a size of the metadata bitmap.

16. A non-transitory processor-readable storage medium having stored therein program code of one or more software programs, wherein the program code when executed by at least one processing device causes the at least one processing device to perform the following steps:

obtaining a request to allocate one or more metadata pages of at least one metadata storage volume, wherein the at least one metadata storage volume is distinct from at least one data storage volume, wherein the at least one data storage volume stores data pages and wherein a given one of the at least one metadata storage volume persistently stores (i) metadata pages, corresponding to the data pages, and (ii) a metadata bitmap, wherein the metadata bitmap of the given metadata storage volume is divided into a plurality of chunks and wherein a designated number of the plurality of chunks of the metadata bitmap is maintained in memory, wherein each bit of the given metadata bitmap indicates whether a corresponding metadata page of the given metadata storage volume is allocated or unallocated;

identifying at least one bit, corresponding to an unallocated metadata page, in a given chunk of a metadata bitmap of metadata pages associated with the at least one metadata storage volume, wherein the given chunk of the metadata bitmap is stored in memory and comprises a portion of the metadata bitmap;

updating a bit value of the identified at least one bit in of the metadata bitmap to indicate the allocation of the one or more metadata pages of the at least one metadata storage volume; and initiating an allocation of the one or more metadata pages.

17. The non-transitory processor-readable storage medium of claim 16, wherein the metadata bitmap is allocated to a designated size.

18. The non-transitory processor-readable storage medium of claim 16, further comprising loading a new chunk of the metadata bitmap having a designated number of bits corresponding to unallocated metadata pages in response to the number of unallocated metadata pages of the given chunk falling below a first designated threshold, and demoting the given chunk in response to the number of unallocated metadata pages of the given chunk falling below a second designated threshold.

19. The non-transitory processor-readable storage medium of claim 16, further comprising, in response to a number of allocated metadata pages of the at least one metadata storage volume exceeding a designated threshold, expanding a number of metadata pages of the at least one metadata storage volume and a size of the metadata bitmap.

20. The method of claim 1, wherein the at least one metadata storage volume and the at least one data storage volume comprise logical partitions of physical storage devices into logical storage volumes.

* * * * *